UNITED STATES PATENT OFFICE.

ROBT. A. CHESEBROUGH, OF NEW YORK, N. Y.

IMPROVED PROCESS FOR DISTILLING PETROLEUM.

Specification forming part of Letters Patent No. 48,367, dated June 27, 1865.

*To all whom it may concern:*

Be it known that I, ROBERT A. CHESEBROUGH, of the city of New York and State of New York, have invented a new and useful Improvement or Process for Purifying, Filtering, and Deodorizing Petroleum and its Products; and I do hereby declare the following to be an exact description thereof.

The nature of my invention consists in the arrangement and combination of bone-dust, pulverized oyster-shells, and cotton cloth for filtering, purifying, and deodorizing petroleum and its products, consisting of benzole or naphtha, illuminating-oil, and lubricating or heavy oil.

My mode of purifying is by distilling the crude petroleum in a still with a condensing-worm, such as is ordinarily used for distilling oils. The products of petroleum by distillation are benzole or naphtha, illuminating-oil, and lubricating or heavy oil, which I filter separately or combined. The materials I use to filter through are bone-dust, pulverized oyster-shells, and cotton or cotton cloth. The oyster-shells are ground to a powder and mixed with the bone-dust in such quantities as the character of the oil may require.

The filter is made of wood or iron, of any suitable form and height, a cylinder being the best form, open at the top, the bottom being perforated with small holes. The diameter of the filter should be about one-third the height. I fill the filter about one-third full with the bone-dust and pulverized oyster-shells, leaving the space of two-thirds of the filter on top of the filtering material for the oil. Underneath the filtering material I place a layer of cotton or cotton cloth, to prevent any of the filtering material escaping with the oil through the small perforated holes, and also for the purpose of cleansing the oil in passing through and freeing the oil from all sediment or particles of the filtering material. The oil is poured in the filter on top of the filtering material and allowed to filter through the holes at the bottom of the filter, where it is collected. I continue filling the filter with oil as fast as it runs through the filtering material, until the filtered oil begins to assume a dark color, when the process is suspended and the filter replenished by fresh material. The naphtha, illuminating-oil, and heavy oil purified by this process will be sweet in odor, of a light color, and will need no other treatment. The oyster-shells cut the heavy oil and separate the colored impurities.

The crude oils from the wells can be purified by this process without any previous distillation, either for the purposes of illumination or of lubrication.

What I claim as my invention, and desire to have secured by Letters Patent, is—

The combination of bone-dust, pulverized oyster-shells, and cotton cloth for purifying, filtering, and deodorizing petroleum, naphtha, and heavy oil, as herein described.

ROBERT A. CHESEBROUGH.

Witnesses:
HORACE E. BROWNE,
SYLVANUS MORRIS.